March 8, 1955
T. F. WORTH
2,703,849
ROTOR FOR DYNAMOELECTRIC MACHINES
AND THE METHOD OF MAKING
Filed May 26, 1951
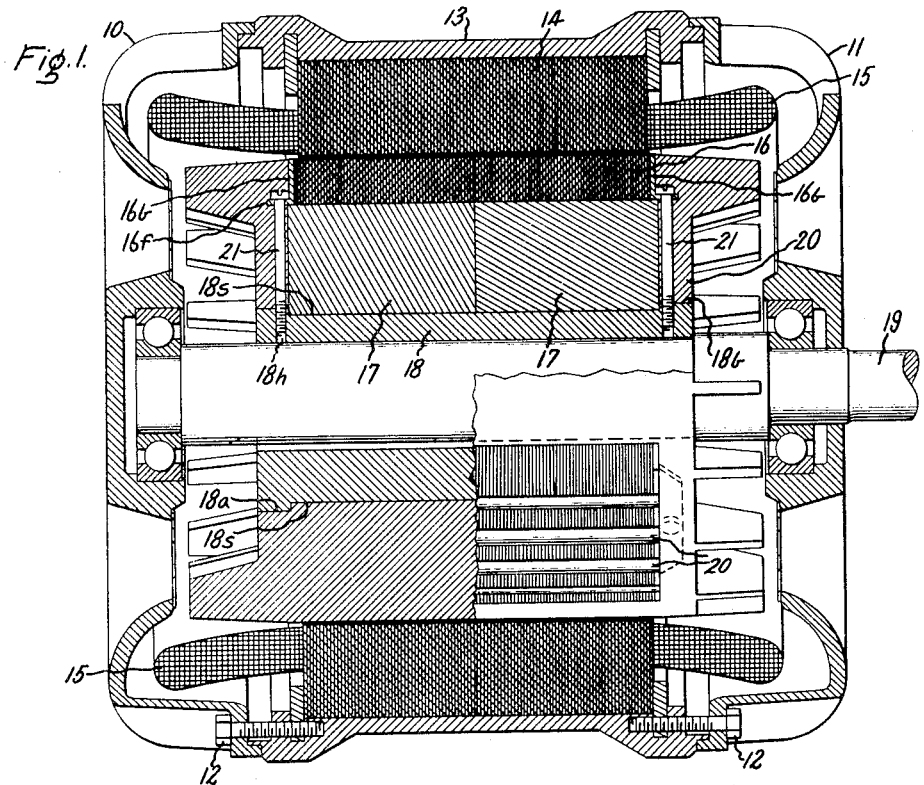
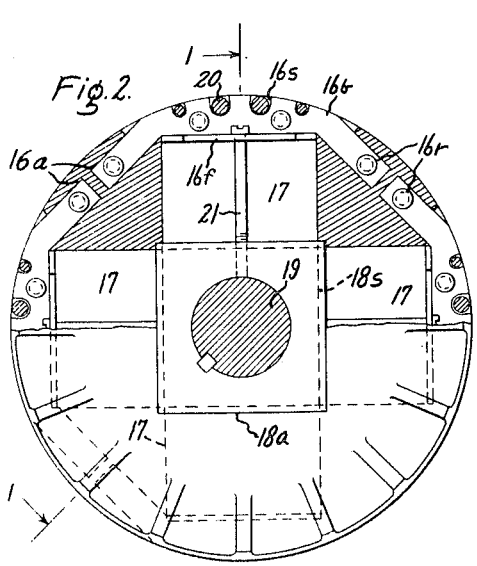
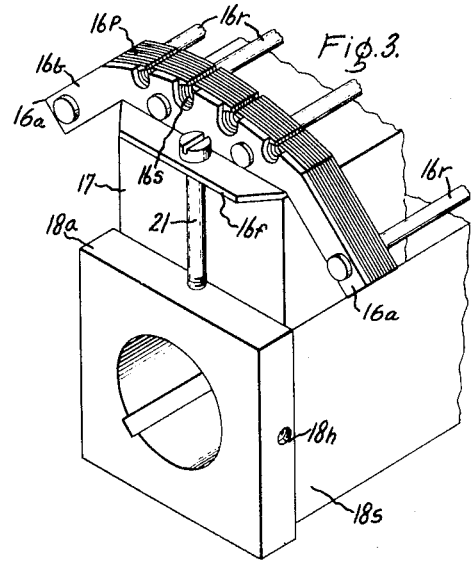
Inventor:
Thomas F. Worth,
by Ernest F. Britton
His Attorney.

2,703,849

ROTOR FOR DYNAMOELECTRIC MACHINES AND THE METHOD OF MAKING

Thomas F. Worth, Lynn, Mass., assignor to General Electric Company, a corporation of New York Application May 26, 1951, Serial No. 228,434

2 Claims. (Cl. 310—156)

My invention relates to rotors for dynamoelectric machines and to methods of making the same and has particular significance in connection with synchronous machines having permanent magnet excitation.

It has long been known that the use of slip ring or other sliding contacts can be avoided by providing a dynamoelectric machine with a rotor having one or more permanent magnets for furnishing the exciting flux. However, the most suitable permanent magnet materials presently known are extremely hard and brittle, making it difficult if not impossible to secure magnets made of such material by ordinary fastening means (such as bolts passing through the members) at least if such magnets are to be secured solidly against centrifugal force and with a high degree of accuracy as is often required to provide high grade dynamoelectric machine performance.

It has been known in the past to provide permanent magnets of a dynamoelectric machine rotor with squirrel cage winding damping means and with additional short circuit winding means for preventing demagnetization of the permanent magnets due to alternating flux in the stator winding at speeds other than synchronous. However, such means are not properly effective unless the construction is substantially symmetrical with, for example, the gaps between pole ends properly adjusted to provide equal leakage paths, a construction ordinarily thought difficult to achieve in view of the mechanical mounting limitations of the permanent magnet material.

It is an object of the present invention to provide simple and inexpensive means for overcoming the above-mentioned difficulties.

Another object of the present invention is to provide a dynamoelectric machine permanent magnet rotor construction which will permit maintaining precision dimensions required to maintain a high degree of machine performance.

A further object of the present invention is to provide a novel and simplified method of making a permanent magnet salient pole rotor provided with laminated salient poles shoes, amortisseur winding damping means and permanent magnet short circuiting means so as to overcome present day mechanical limitations of known permanent materials.

Briefly stated, in accordance with one aspect of my invention, I eliminate permanent magnet holding problems in a dynamoelectric machine rotor by machining magnet flat faces to accurately mount the magnets on machined flat faces of a square or polyhedral central shell, first securing the magnets to the shell by clamping pole shoes having clamping flanges extruding axially beyond the magnets and then casting a non-ferrous metallic damping and short-circuit winding in place to securely hold both magnets and pole shoes, thereby to take full advantage of low shrink rate as well as the non-magnetic properties of the non-ferrous metal.

Other objects and advantages will become apparent and my invention will be better understood from consideration of the following description taken in connection with the accompanying drawing in which Fig. 1 is an elevational view of a generator having a rotor constructed in accoradnce with my invention; Fig. 2 is an end view, partly broken away, of the rotor shown in Fig. 1; and Fig. 3 is a perspective view of a portion of the rotor of Figs. 1 and 2 during an intermediate step of its manufacture.

Referring now to Fig. 1, I have shown an electric generator provided with shaft bearing supporting endshields 10 and 11 secured as by bolts 12 to a stator yoke 13. The machine is provided with a stator laminated core portion 14 having a stator output winding 15 arranged to react electrodynamically with the machine rotor comprising rotor laminated salient pole shoes 16, permanent magnets 17, a flat faced central sleeve or shell 18, and shaft 19. The entire assembly of block-like permanent magnets 17 arranged about flat faces of shell 18 is securely and permanently held in place by a cast winding 20 as hereinafter more fully described.

Shell 18 is conveniently made by taking a steel bar, having a hole through its center to accommodate shaft 19 so as to be rotatable therewith, and milling a flat faced slot 18s around to provide end shoulders 18a and 18b with the flat section 18s intermediate the shoulders being machined to a desirable accuracy as hereinafter indicated.

Because of the present limitations on size and shape of members of permanent magnet material, they are generally provided in the form of rectangular blocks and it may be found desirable to place two such blocks 17 side by side, as shown in Fig. 1, but in any event one or more blocks 17 are, for a four pole machine, placed on each of four flat faces of the machine's periphery 18s being placed on one side at a time and held thereon by the associated laminated pole shoe 16. Pole shoes 16 are, in accordance with the illustrated embodiment of the invention, first fashioned of arcuate punchings 16p and end brackets 16b which may be held together in any suitable manner as by rivets 16r (see Figs. 2 and 3). In order to accommodate the squirrel cage winding later to be described, the periphery of each pole shoe 16 is provided with winding slots 16s.

The pole shoes are mounted over the radially outer faces of the magnet blocks 17, and in order to secure shoes, and therefore also the blocks, I provide the end brackets 16b each with a flange portion 16f and place the brackets so that the flange portions 16f overhang the axial ends of the magnet blocks. I also provide fastening means such as bolts 21 engaging the flange portions 16f, and also engaging tapped holes 18h provided in the shell end shoulders 18a and 18b. I do not mean to limit my invention to a construction in which a central shell is used for obviously the shaft itself could, intermediate its bearings, provide the required flatted faces for seating the magnets and holding the axially overhanging pole face end brackes by fastening means located axially outside of the magnets.

A problem presents itself in controlling the gaps between the laminated pole shoe ends, but the problem may readily be met by grinding the mating surfaces of laminated pole shoe inner faces and adjacent magnet block outer faces, and of each magnet block inner face adjacent the central milled slot 18s, so that all gaps between pole face ends 16e can be accurately equalized before casting the winding 20. When all gaps between pole ends are so adjusted, the screws 21 are tightened and then the rotor assembly of magnets and bolted pole faces is placed in a die or mold (not shown) and a non-ferrous (i. e., non-magnetic) winding material 20 (such as aluminum) is cast, flowing between and around the magnets and around their ends to form magnet short circuiting winding means, and also flowing within winding slots 16s provided in the pole shoes to provide a squirrel cage or amortisseur winding means acting as a damping winding (for generator action) or as a starting winding (if the dynamoelectric machine is to be used as a motor), and also completely covering the bolts 21 and flange portions 16f to solidly secure all of the parts against centrifugal, vibrational and other forces.

There is thus provided a device, and method of making, of the type described capable of meeting the objects hereinabove set forth. Placing the rectangular or square blocks of magnetic material one or two at a time on each flat face of a central member, and holding thereon by an arcuate assembly of laminations, more or less temporarily bolted to the central portion, permits making an assembly of utmost accuracy before it is irrevocably and permanently held in place by the non-ferrous casting technique. With the construction or method of the invention, there is no problem of cracking the magnet material as would be the case if an attempt were made to drill a hole through such material or to exert a concentrated bolt pressure directly on such material adjacent such a hole.

While I have illustrated and described particular embodiments of my invention, various modifications will obviously occur to those skilled in the art. I desire it to be understood, therefore, that my invention is not to be limited to the particular arrangements above described, and I intend in the appended claims to cover all modifications which do not depart from the true spirit and scope of my invention.

What I claim as new and desire to secure by Letters Patent of the United States is:

1. A dynamoelectric machine permanent magnet type rotor comprising a polyhedral central member, a plurality of rectangular permanent magnets located at least one on each of several faces of said polyhedral central member, a plurality of arcuate pole shoes of laminated magnetic material arranged over the outer ends of said magnets and provided with end brackets having flanges overhanging the axial ends of said magnets, said pole shoes having pole ends circumferentially spaced from the pole ends of adjacent pole shoes to provide flux leakage paths therebetween, radially extending bolts fastening each of said flanges to said polyhedral central member with the gaps between adjacent pole ends adjusted to provide equal leakage paths, and a non-ferrous short circuiting winding cast around said polyhedral central sectioned member, around and between said magnets, and over said bolting means.

2. A rotor for a dynamoelectric machine, said rotor comprising in combination a central shaft, a polyhedral shell bored to accommodate said shaft, said shell being centrally milled to provide a slot around the flat sides thereof, said slot defining raised end shoulders on said sleeve, a plurality of permanent magnet members arranged by pairs between said shoulders and on the flat bases of said slot, a plurality of arcuate pole shoes of laminated magnetic material substantially surrounding said magnet members and having inner and outer axial end flanges extending axially beyond said magnet members, radially extending bolts securing said end flanges and consequently said arcuate pole faces and said magnet members to said end shoulders of said sleeve, said arcuate pole faces having slots adapted to contain a damper winding, and a single non-ferrous casting comprising said damper winding as well as a short circuiting winding for all of said magnets and also comprising means for permanently holding said magnet members and said pole faces permanently in place independently of said bolts.

References Cited in the file of this patent

UNITED STATES PATENTS

| | | |
|---|---|---|
| 920,886 | Underwood | May 4, 1909 |
| 939,910 | Hassler | Nov. 9, 1909 |
| 1,932,978 | Louis | Oct. 31, 1933 |
| 2,236,291 | Kilbourne | Mar. 25, 1941 |
| 2,485,474 | Brainard | Oct. 18, 1949 |
| 2,493,102 | Brainard | Jan. 3, 1950 |
| 2,516,901 | Morrill | Aug. 1, 1950 |
| 2,626,367 | Beymer | Jan. 20, 1953 |
| 2,655,611 | Sherman | Oct. 13, 1953 |